No. 756,080.

Patented March 29, 1904.

UNITED STATES PATENT OFFICE.

JOSEPH E. TICHON, OF NEW BEDFORD, MASSACHUSETTS, ASSIGNOR TO THEODORE E. PARKER, OF NEW BEDFORD, MASSACHUSETTS, AND HENRY F. STROUT AND J. COLBY BASSETT, OF BOSTON, MASSACHUSETTS, TRUSTEES.

BRAZING COMPOUND.

SPECIFICATION forming part of Letters Patent No. 756,080, dated March 29, 1904.

Application filed October 3, 1903. Serial No. 175,601½. (No specimens.)

*To all whom it may concern:*

Be it known that I, JOSEPH E. TICHON, of New Bedford, in the county of Bristol and State of Massachusetts, have invented certain new and useful Improvements in Brazing Compounds, of which the following is a specification.

This invention has for its object to provide a brazing or welding compound by the use of which metallic surfaces, and particularly cast-iron, may be more effectively welded or brazed than hitherto.

Heretofore it has been proposed to employ either borax or boracic acid in combination with other substances; but I have found that what may be termed "boro-boracic acid" possesses advantages not possessed by either. This boro-boracic acid may be used with different substances for forming a flux and for forming a spelter, and for some purposes it may be employed by itself in a dry form. To form a paste for coating the parts to be joined, it is mixed with iron filings and water, and to form a spelter it is mixed with copper and zinc.

The boro-boracic acid is made by adding water to equal parts of sodium borate ($Na_2B_4O_7$) and boracic anhydrid ($B_2O_3$) and boiling and evaporating the water until a dry powder is left. This powder melts at a temperature higher than sodium borate and lower than boracic anhydrid and intumesces more quietly than either, whereby the paste in which it is used remains with greater certainty upon the surfaces coated thereby. It mixes better with the molten mass of the spelter and the iron filings than either borax or boracic acid and more effectively absorbs the oxids formed, in addition to preventing the access of oxygen.

In the use of boro-boracic acid in brazing together two pieces of cast-iron the following steps may be taken: The surfaces are cleansed and coated with the paste hereinbefore described, after which they are heated to a red heat. The spelter previously described is then poured on the joint, and the temperature of the parts is raised to a higher degree, after which dry boro-boracic acid is poured on the joint and the brazed metal allowed to cool or is cooled by an air-blast.

What I claim is—

1. A brazing compound containing boro-boracic acid.

2. A brazing compound containing boro-boracic acid and particles of metal.

3. A flux comprising boro-boracic acid.

In testimony whereof I have affixed my signature in presence of two witnesses.

JOSEPH E. TICHON.

Witnesses:
MARCUS B. MAY,
C. C. STECHER.